3,265,725
PROCESS FOR THE PRODUCTION OF GAMMA-HALONITRILES BY THE 1,2 ADDITION OF ALPHA-HALONITRILES TO ACTIVATED OLEFINS
Harvey S. Klein, Berkeley, and Frederick F. Rust, Orinda, Calif., assignors to Shell Oil Company, New York, N.Y., a corporation of Delaware
No Drawing. Filed Oct. 11, 1963, Ser. No. 315,665
12 Claims. (Cl. 260—465.4)

This invention relates to an improved method for the production of certain γ-halonitriles. More particularly, it relates to an improved process for the addition of haloacetonitriles to certain activated olefinic compounds.

Methods are available for the addition of haloacetonitriles to olefins. Ladd, U. S. 2,615,915, describes a method for the peroxide-catalyzed addition of trichloroacetonitrile to ethylene to produce, inter alia, 2,2,4-trichlorobutyronitrile. Related methods are available for the addition of mono- and di-bromoacetonitrile to olefinic materials. Such peroxide-catalyzed methods, although producing a 1:1 addition product, frequently result in the production of telomers containing more than one olefinic moiety per moiety of haloacetonitrile. Such telomeric products apparently arise from the addition of the elements of the haloacetonitrile to a low polymer of the olefinic compound, e.g., ethylene. When the olefinic reactant is activated, e.g., by the presence of some substituent group attached to the olefinic linkage, greater problems arise due to the more readily polymerizable character of the unsaturated reactant. When such peroxide-catalyzed procedures are employed with activated olefins, extensive if not exclusive polymerization of the olefinic reactant occurs, and little if any formation of 1:1 addition product is observed.

It is an object of the present invention to provide an improved process for the production of certain γ-halonitriles. More particularly, it is an object of the present invention to provide an improved process for the 1,2-addition of haloacetonitriles to activated olefins, which process results in essentially exclusive production of 1:1 addition product.

It has now been found that these objects are accomplished by the process for the 1,2-addition of mono- to tri-haloacetonitriles to olefinic compounds wherein the olefinic linkage is activated by conjugation with non-carbon-carbon unsaturation, in the presence of certain metallic compounds as catalyst.

The metallic compounds which have been found to be useful catalysts for the process of the invention are copper compounds, particularly salts comprising copper cations, either in the cuprous or cupric oxidation state, and simple anions, inorganic or organic. Although copper compounds such as the acetate, nitrate, isothiocyanate, sulfate and the like are operable, best results are obtained when the catalyst employed is a halide, e.g., fluoride, chloride, bromide or iodide. Preferred are copper halides wherein the halogen has an atomic number from 17 to 35, that is the middle halogens chlorine and bromine. Although in general the cuprous salts are preferred over the corresponding cupric salt, in most cases cupric salts give satisfactory results. Particularly preferred as catalyst for the process of the invention is cuprous chloride.

The haloacetonitrile reactants possess from 1 to 3 halogen substituents on the alpha carbon atom, which halogen substituents may be the same or may be different. Although acetonitrile reactants possessing fluorine, chlorine, bromine or iodine substituents are operable, preferred are the haloacetonitriles wherein each halogen substituent has an atomic number from 17 to 35, and further preferred are the haloacetonitrile reactants wherein all halogen substituents, if more than one halogen substituent is present, are the same halogen, especially the halogen chlorine. Illustrative of such haloacetonitrile reactants are monochloroacetonitrile, dichloroacetonitrile, trichloroacetonitrile and analogous bromo, fluoro, and iodo compounds.

The olefinic reactants of the process of the invention are characterized by the presence of an ethylenic linkage, i.e., a non-aromatic carbon-carbon double bond, which is activated by conjugation with non-carbon-carbon unsaturation. By the term "non-carbon-carbon unsaturation" is meant an unsaturated linkage, that is, a multiple bond, between two atoms, at least one of which is not carbon. Illustrative groups incorporating such non-carbon-carbon unsaturation are the carbonyl (including formyl), carboxy, carboalkoxy, cyano, imino, carbonyloxy, thiono, oximino, azo and like radicals. The olefinic reactant is preferably hydrocarbon, except for atom(s) of the functional group incorporating the non-carbon-carbon unsaturation which is conjugated with the ethylenic linkage, and preferably contains the single ethylenic linkage as the only non-aromatic carbon-carbon unsaturation in the molecule. Preferred olefins contain from 2 to 20 carbon atoms, more preferably from 3 to 12. Exemplary olefinic reactants suitable in the process of the invention are α,β-ethylenically unsaturated aldehydes such as acrolein, crotonaldehyde, methacrolein, cinnamaldehyde, α-phenylacrolein and 2 - hexenal; α,β - ethylenically unsaturated ketones including methyl vinyl ketone, decyl vinyl ketone, propyl propenyl ketone, ethyl 1-hexenyl ketone and p-tolyl vinyl ketone; α,β-ethylenically unsaturated acids such as acrylic acid, methacrylic acid, maleic acid, 2-methyleneglutaric acid, cinnamic acid and 2-heptenoic acid; α,β-ethylenically unsaturated nitriles, such as acrylonitrile, crotononitrile, methacrylonitrile, 1,4-dicyano-1-butene, 2-methyleneglutaronitrile and 1-cyano-1-octene; anhydrides wherein at least one carbonyl group of the bis(carbonyl)oxy linkage is conjugated with ethylenic unsaturation, e.g., maleic anhydride, α-methylenesuccinic anhydride and α-methyleneglutaric anhydride; and esters, preferably lower alkyl esters, of α,β-ethylenically unsaturated alkenoic acids such as methyl acrylate, propyl acrylate, octyl methacrylate, butyl crotonate and ethyl 2-octenoate.

Most preferred, however, are those olefinic reactants possessing an ethylenic linkage conjugated with non-carbon-carbon unsaturation wherein the olefinic linkage is otherwise unsubstituted except with hydrogen atoms. One class of such compounds is represented by the formula $$CH_2=CH-E$$

wherein E is cyano, formyl, carboxy,

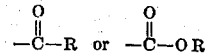

wherein R is lower alkyl, preferably having from 1 to 8 carbon atoms, especially those compounds of the above-depicted formula wherein the E group has no acidic hydrogens. These compounds are acrolein, acrylonitrile and alkyl acrylates wherein the alkyl moiety has from 1 to 8 carbon atoms, e.g., methyl acrylate, ethyl acrylate, butyl acrylate and octyl acrylate.

The haloacetonitrile and the olefinic reactant are employed in any convenient ratio, as an excess of either does not appear to be detrimental to the process of the invention. Molar ratios of haloacetonitrile to olefinic reactant from about 5:1 to about 1:5 are generally satisfactory, while molar ratios of from about 2:1 to about 1:2 are preferred. Satisfactory results are frequently obtained when the reactants are employed in amounts that are substantially stoichiometric, that is, a molar ratio of haloacetonitrile to olefinic reactant that is substantially 1:1.

The copper compound is employed in catalytic amounts. While the optimum amount of catalyst will depend upon the particular haloacetonitrile, olefinic reactant and copper compound employed, amounts of catalyst from about 0.005 mole to about 0.5 mole per mole of limiting reactant are generally satisfactory, while amounts of catalyst from about 0.05 mole to about 0.2 mole per mole of limiting reactant are preferred.

The process of the invention is conducted in liquid phase solution in an inert solvent. Solvents that are suitable are liquid at reaction temperature and pressure, are capable of dissolving the reactants and are substantially inert towards the haloacetonitrile and olefinic reactants and the products produced therefrom. Preferred solvents are polar, that is, contain uneven charge distribution, and include such solvents as the alcohols, particularly lower monohydric and polyhydric alkanols such as methanol, ethanol, sec-butanol, tert-butanol, 2-ethyl-hexanol, glycerol, ethylene glycol and 1,2,6-hexanetriol as well as the ether-alcohols, e.g., the Cellosolves and the Carbitols; the lower alkyl nitriles such as acetonitrile propionitrile and butyronitrile; esters such as methyl acetate ethyl propionate and propyl butyrate; sulfones such as diethyl sulfone propyl hexyl sulfone and sulfolane; and N,N-dialkylamides such as dimethylformamide and N,N-diethylacetamide. Most satisfactory solvents comprise the nitriles, especially the cyanoalkanes, and particularly preferred as reaction solvent is acetonitrile.

The reaction process is conducted at atmospheric, subatmospheric or superatmospheric pressure, so long as the reactants are maintained in the liquid phase. Advantageous use is frequently made of the pressures generated when the reaction mixture is heated to reaction temperature in a sealed reaction vessel, which pressures will be somewhat but not substantially higher than atmospheric pressure. Suitable reaction temperatures for the process of the invention vary from about 50° C. to about 200° C., although the optimum reaction temperature will depend in part upon the number of halogen substituents upon the haloacetonitrile reactant. When trihaloacetonitriles are employed as reactants, preferred reaction temperatures are from about 75° C. to about 120° C., while the preferred temperature range for the addition of dihaloacetonitrile is from about 100° C. to about 140° C. and best results are obtained when the haloacetonitrile reactant possesses a single halogen substituent if temperatures from about 110° C. to about 170° C. are employed.

The process of the invention is conducted by mixing the reactants, solvent and catalyst and maintaining the reaction mixture at the desired temperature until reaction is complete. The method of mixing is not material. One reactant may be added to the other in increments, although it is equivalently useful to initially mix the entire amounts of reactants. Subsequent to reaction, the product mixture is separated by conventional means such as by fractional distillation, selective extraction or crystallization.

The products of the process of the invention are γ-halonitriles possessing from 0 to 2 additional halogen substituents on the carbon atom alpha to the nitrile moiety, depending upon the number of halogen substituents on the haloacetonitrile reactant. The products possess as an additional substituent upon the γ-carbon atom the non-carbon-carbon unsaturated moiety of the olefinic reactant. When the process of the invention is conducted employing trichloroacetonitrile and acrylonitrile as reactants, the process is illustrated by the equation below.

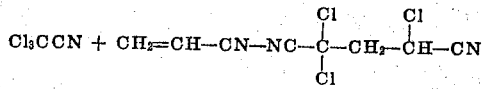

Illustrative of other typical products are 2-chloroglutaronitrile produced from monochloroacetonitrile and acrylonitrile, ethyl 4-cyano-2,4-dichlorobutyrate produced from dichloroacetonitrile and ethyl acrylate, methyl 4-cyano-2,4,4-tribromobutyrate produced from tribromoacetonitrile and methyl acrylate, and 4-cyano-2,4-dichlorobutyraldehyde produced from dichloroacetonitrile and acrolein.

The products of the process of the invention are valuable as agricultural chemicals, but find particular utility as chemical intermediates. Due to the variety of type and location of the substituents present, many useful materials may be produced from the products of the invention. The nitrile may be hydrolyzed to the corresponding acid or alternatively may be reduced to the corresponding amine or amide. A formyl substituent may be oxidized to the carboxy group, or formyl, carboxy and like substituents may be reduced to produce an alcohol. The halogens present may be reacted with tertiary amines to produce useful quaternary ammonium salts, or with salts of carboxylic acids to produce esters, or with phenoxides or alkoxides to produce ethers. Additionally, the halogen-containing product may be dehydrohalogenated to produce ethylenic linkages. A particular utility of the products of the invention is found in the production of amino acids. For example, 2-chloroglutaronitrile, the product of the reaction of monochloroacetonitrile and acrylonitrile, may be aminated by reaction with ammonia or like material and hydrolyzed to produce glutamic acid.

To further illustrate the improved process of the invention, the following examples are provided. It should be understood that they are not to be regarded as limitations, as the teachings thereof may be varied as will be understood by one skilled in this art.

Example I

To a glass tube was charged 1.5 g. of dichloroacetonitrile, 0.72 g. acrylonitrile, 0.15 g. of cuprous chloride and 2.5 ml. of acetonitrile. The tube was sealed and maintained at 115° C. for three hours, after which the product mixture was washed with water and dried. A gas-liquid chromatographic analysis of the product mixture indicated that 2,4-dichloroglutaronitrile, B.P. 257° C., $n_D^{25}$ 1.4819, was produced in quantitative yield based upon a 57% conversion.

|  | Anal. Calc. | Found |
|---|---|---|
| C, percent wt | 36.8 | 37.0 |
| H, percent wt | 2.5 | 2.7 |
| Cl, percent wt | 43.6 | 42.8 |
| N, percent wt | 17.2 | 16.7 |

Example II

To a glass tube was charged 1.5 g. of dichloroacetonitrile, 1.2 g. methyl acrylate, 0.15 g. cuprous chloride and 2.5 ml. acetonitrile. The tube was sealed and allowed to stand at room temperature overnight and at 115–120° C. for 1 hr. The product mixture was removed from the tube, washed and dried, and analyzed by gas-liquid chromatography. A quantitative yield of methyl 4-cyano-2,4-dichlorobutyrate, B.P. 247–248° C., $n_D^{25}$ 1.4697, based upon a conversion of 42%, was obtained.

|  | Anal. Calc. | Found |
|---|---|---|
| C, percent wt | 36.8 | 36.8 |
| H, percent wt | 3.6 | 3.5 |
| Cl, percent wt | 36.2 | 36.3 |

Example III

The procedure of Example II was followed to react 1.14 g. of methyl acrylate with 1.0 g. of mono-chloroacetonitrile in 2 ml. of acetonitrile in the presence of 0.15 g. of cuprous chloride at 140° C. for 39 hours. The product, methyl 4-cyano-2-chlorobutyrate, B.P. 253° C., $n_D^{25}$ 1.4530, was obtained in quantitative yield, based upon a 15% conversion.

|   | Anal. Calc. | Found |
|---|---|---|
| C, percent wt | 44.6 | 44.5 |
| H, percent wt | 5.0 | 5.0 |
| Cl, percent wt | 22.0 | 21.2 |
| N, percent wt | 8.7 | 8.5 |

*Example IV*

The procedure of Example I was followed to react 1.51 g. of mono-chloroacetonitrile with 1.05 g. of acrylonitrile in 2.5 ml. of acetonitrile in the presence of 0.15 g. of cuprous chloride for 70 hours at 130° C. A theoretical yield of product, 2-chloroglutaronitrile, B.P. 250° C. $n_D^{25}$ 1.4640, was obtained, based upon a 9% conversion.

|   | Anal. Calc. | Found |
|---|---|---|
| C, percent wt | 46.7 | 46.8 |
| H, percent wt | 3.9 | 4.0 |
| Cl, percent wt | 27.6 | 26.3 |

*Example V*

To a glass tube was charged 1.3 5 g. of dichloracetonitrile, 0.76 g. of acrolein which had been freshly distilled and was inhibited with hydroquinonne, 0.15 g. of cuprous chloride and 2.5 ml. of acetonitrile. The tube was sealed and the reaction mixture was heated at 120° C. for 1.5 hours. The contents of the tube were removed, washed with water, dried and analyzed by gas-liquid chromatography. The product observed after contact with water was 4-cyano-2,4-dichlorobutyradehyde hemihydrate, $n_D^{25}$ 1.5095, and was obtained in 85% yield based upon a 25% conversion. The infrared spectrum showed bands characteristics of a hydrated aldehyde, and the nuclear magnetic resonance spectrum was consistent with the above formula.

|   | Anal. Calc. $C_5H_5NCl_2O \cdot \frac{1}{2} H_2O$ | Found |
|---|---|---|
| C, percent wt | 34.3 | 35.1 |
| H, percent wt | 3.4 | 3.4 |
| N, percent wt | 8.0 | 7.7 |
| Cl, percent wt | 40.6 | 40.3 |

*Example VI*

When the procedure of Example II is employed to react trichloro acetonitrile with ethyl acrylate in the presence of a catalytic amount of cuprous chloride in acetonitrile solution, a good yield of ethyl 4-cyano-2,4,4-trichlorobutytrate is obtained.

A similar result is obtained when cupric chloride is employed as catalyst.

*Example VII*

When dibromacetonitrile is reacted with methyl vinyl ketone in the presence of cuprous bromide in dimethylformamide solution, a good yield of methyl 3-cyano-1,3-dibromopropyl ketone is obtained.

We claim as our invention:

1. The process for the production of a γ-halonitrile product by the 1,2-addition of mono- to trihaloacetonitrile to the ethylene double bond of an olefinic compound of from 2 to 20 carbon atoms, said olefinic compound being an otherwise hydrocarbon compound having a single functional group selected from carbonyl, carboxy, carboalkoxy, or cyano wherein the non-carbon-carbon unsaturation of said functional group is conjugated with said ethylenic linkage, the ethylenic linkage being the only non-aromatic carbon-carbon unsaturation of the olefinic compound, in liquid, phase solution in inert solvent wherein the molar ratio of said haloacetonitrile to said olefinic compound is from about 5:1 to about 1:5, at a temperature from about 50° C. to about 200° C., in the presence of from about 0.005 mole to about 0.5 mole per mole of limiting reactant of a copper salt as catalyst.

2. The process of claim 1 wherein the copper salt is cuprous halide.

3. The process for the production of a γ-halonitrile product by the 1,2-addition of mono- to trihaloacetonitrile to the ethylenic double bond of the olefinic of the formula $$CH_2=CH-E$$

wherein E is selected from the group consisting of cyano, formyl, carboxy,

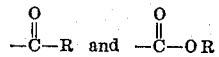

wherein R is alkyl having 1 to 8 carbon atoms, in liquid-phase solution in inert solvent wherein the molar ratio of said haloacetonitrile to said olefinic compound is from about 5:1 to about 1:5, at a temperature from about 50° C. to about 200° C., in the presence of from about 0.005 mole to about 0.5 mole per mole of limiting reactant of cuprous halide as catalyst.

4. The process of claim 3 wherein the mono- to trihaloacetonitrile is mono- to trichloroacetonitrile.

5. The process of claim 3 wherein the cuprous halide is cuprous chloride.

6. The process for the production of mono- to trichloroglutaronitrile by the 1,2-addition of mono- to trichloroacetonitrile to acrylonitrile, in liquid-phase solution in inert solvent wherein the molar ratio of said chloroacetonitrile to acrylonitrile is from about 5:1 to about 1:5, at a temperature from about 50° C. to about 200° C., in the presence of from about 0.005 mole to about 0.5 mole per mole of limiting reactant of cuprous chloride catalyst.

7. The process of claim 6 wherein the chloroacetonitrile is mono-chloroacetonitrile.

8. The process of claim 6 wherein the chloroacetonitrile is dichloracetonitrile.

9. The process for the production of lower alkyl mono- to trichloro(4-cyano)butyrates by the 1,2-addition of mono- to trichloroacetonitrile to alkyl acrylate wherein the alkyl moiety has from 1 to 8 carbon atoms, in liquid-phase solution in inert solvent wherein the molar ratio of said chloroacetonitrile to said alkyl acrylate is from about 5:1 to about 1:5, at a temperature from about 50° C. to about 200° C., in the presence of from about 0.005 mole to about 0.5 mole per mole of limiting reactant of cuprous chloride as catalyst.

10. The process of claim 9 wherein the chloroacetonitrile is mono-chloracetonitrile.

11. The process of claim 9 wherein the chloroacetonitrile is dichloracetonitrile.

12. The process for the production of mono- to trichloro-4-(cyano)-butyraldehyde by the 1,2-addition of mono- to trichloroacetonitrile to acrolein in liquid-phase solution in inert solvent wherein the molar ratio of said chloroacetonitrile to acrolein is from about 5:1 to about 1:5, at a temperature from about 50° to about 200° C., in the presence of from about 0.005 mole to about 0.5 mole per mole of limiting reactant of cuprous chloride as catalyst.

No references cited.

CHARLES B. PARKER, *Primary Examiner.*

JOSEPH P. BRUST, *Assistant Examiner.*